United States Patent [19]

Thomson et al.

Best Available Copy

[11] 4,296,330

[45] Oct. 20, 1981

[54] FLOWING GAS DISCHARGE SOURCE OF VACUUM ULTRA-VIOLET LINE RADIATION SYSTEM

[75] Inventors: George M. Thomson, Churchville; Keith A. Jamison, Aberdeen, both of Md.

[73] Assignee: The United States of America as represented by the Secretary of the Army, Washington, D.C.

[21] Appl. No.: 140,646

[22] Filed: Apr. 16, 1980

[51] Int. Cl.[3] .......... G01J 1/00

[52] U.S. Cl. .......... 250/504 R; 250/426

[58] Field of Search .......... 250/504, 343, 372, 373, 250/426; 315/111.2; 313/231.7

[56] References Cited

U.S. PATENT DOCUMENTS

| | | | |
|---|---|---|---|
| 3,020,431 | 2/1962 | Martina | 250/426 |
| 3,026,435 | 3/1962 | McPherson | 313/231.7 |
| 3,222,569 | 12/1965 | Winzeler et al. | 313/231.7 |
| 3,515,932 | 6/1970 | King | 315/111.2 |
| 4,207,499 | 6/1980 | Tam et al. | 313/231.7 |

*Primary Examiner*—Harold A. Dixon
*Attorney, Agent, or Firm*—Nathan Edelberg; Robert P. Gibson; Max Yarmovsky

[57] ABSTRACT

A flowing gas source of vacuum ultraviolet line radiation system capable of operating efficiently at low pressures and low power levels. The system includes a source body assembly having nozzle member with an orifice on one end for sustaining an electrical discharge; a vacuum vessel for providing an evacuated region outside the orifice; a cooling jacket over a gas tubular element; and an insulator mounted upon the tubular element by vacuum coupling separating the source body electrically from the vacuum vessel. The vacuum ultraviolet radiation is derived from an electrical discharge sustained in a gaseous/vaporous media which flows through a differentially pumped orifice. The inherent differential pumping at the nozzle orifice results in a reduced gas load to instrumentation which may be operatively connected to the output port of the vacuum vessel.

4 Claims, 2 Drawing Figures

FLOWING GAS DISCHARGE SOURCE OF VACUUM ULTRA-VIOLET LINE RADIATION SYSTEM

GOVERNMENTAL INTEREST

The invention described herein may be manufactured, used and licensed by or for the Government for Governmental purposes without the payment to us of any royalties thereon.

BACKGROUND OF THE INVENTION

The present invention relates to a field of the art dealing with vacuum ultraviolet (VUV) line radiation. Representative examples of the art in this area appear in "Techniques of Vacuum Ultraviolet Spectroscopy" by J. R. Sampson & Wiley 1967-New York.

Vacuum ultraviolet line radiation has been produced by a wide variety of techniques. Most techniques are based upon the atomic/ionic excitation and subsequent decay by photo emission that occurs in electrical discharges. Generally, these discharges fall into four broad categories: (a) glows; (b) arcs; (c) R. F./microwave discharges; and (d) high voltage sparks.

(a) *Glow Discharges:* The most commonly used device, the glow discharge VUV source consists of an insulating refractory tube with electrodes fastened at each of its ends. If a gas or vapor is admitted into the tube at a pressure of a few hundred millitorr and if a potential of a few hundred volts is applied across the electrodes, the gas begins to glow. Such glow discharge sources are usually simple, stable, moderately powered, and can be made to operate with a wide variety of different species. However, these sources are often limited by their low brightness and high operating gas pressures. Therefore, this is not useful for applications that involve grating spectroscopes, windowless multipliers and other devices requiring high vacuums.

(b) *Arcs:* If the potential across a glow discharge tube is increased, ultimately a further breakdown occurs and the discharge becomes an arc. A magnetic field can be used to axially concentrate the arc, as in the duoplasmatron source, which increases the overall brightness as well as the ionic characteristic radiation yield. The increased brightness of arc sources allows the use of differential pumping to relieve the problems created by the source gas load. However, because of the increased complexity brought about by the addition of magnet and filament systems arc sources have proven too costly for many uses.

(c) *R. F.—Microwave Discharges:* Energy pumped into a gas in the form of microwaves or R. F. can induce a discharge at power levels comparable to glows and arcs. However, electronic complexity and high operating gas pressures/loads are inherent in the design of R. F./Microwave sources. Other fundamental limitations on available brightness due to gas-energy coupling considerations are also present in such devices. This combination of difficulties in applications of R. F. sources to cases in which their high spectral purity is a dominant consideration.

(d) *High Voltage Sparks:* At reduced pressures the application of a high potential (several kilovolts) across a gas column results in a spark discharge. The combination of high potential and long mean free path allows the electrons and ions in the spark to attain energies sufficient for multiple collisional ionization. Hence, the resulting VUV spectro are rich in lines characteristic of highly stripped species. Spark sources have been manufactured for a wide variety of different species. Nearly all involve very high temperatures, high power levels and rapid erosion of source components. These difficulties mandate use of refractory construction, extensive cooling, and pulsed operation. In most applications the gas load imposed by these sources is seldom a problem.

Accordingly, the present invention may be viewed as a means for providing an improved vacuum ultraviolet lamp system that would enable the prior art to overcome the basic shortcomings as have been enumerated above.

SUMMARY OF THE INVENTION

The present invention discloses a flowing gas source of vacuum ultraviolet line radiation system. The system comprises three assemblies, namely the source body assembly, the vacuum vessel assembly, and the gas supply assembly. The source body assembly consists of a metallic tube, concentric cooling and electrical insulating structures, a gas inlet which is attached at one end of the tube, and a nozzle that contains a small orifice which is attached to the other. The source body assembly is mounted so that its nozzle end projects into the evacuated vacuum vessel assembly. In operation the source body assembly exists at a negative electrical potential with respect to the vacuum vessel. A burst of gas flowing from the gas supply assembly through the source body into the vacuum vessel assembly initiates an electrical discharge, at the nozzle orifice, which may subsequently be maintained at reduced flow rates. The discharge is a strong source of vacuum ultraviolet line radiation characteristic of the gaseous and ionic species. The inherent differential pumping at the orifice results in a substantially reduced gas load in the vacuum vessel. The source is mechanically and electrically simple and inexpensive to construct and operate.

It is the object of the present invention to provide a simple, continuous operating vacuum ultraviolet source producing high brightness at low gas flow rates and pressures, modest power levels, and reduced voltages.

It is another object to provide an alternative to or improvement upon conventional glow discharge, arc, R. F.-Microwave and spark sources.

It is a further object to provide a vacuum ultraviolet source for trouble free use in conjunction with grating spectroscopes, windowless detectors and other apparatus requiring vacuum ultraviolet line radiation in a vacuum environment.

It is a further object to provide a source of ion fluxes for accelerator systems and other useful applications.

DETAILED DESCRIPTION OF THE INVENTION

Figure 1:
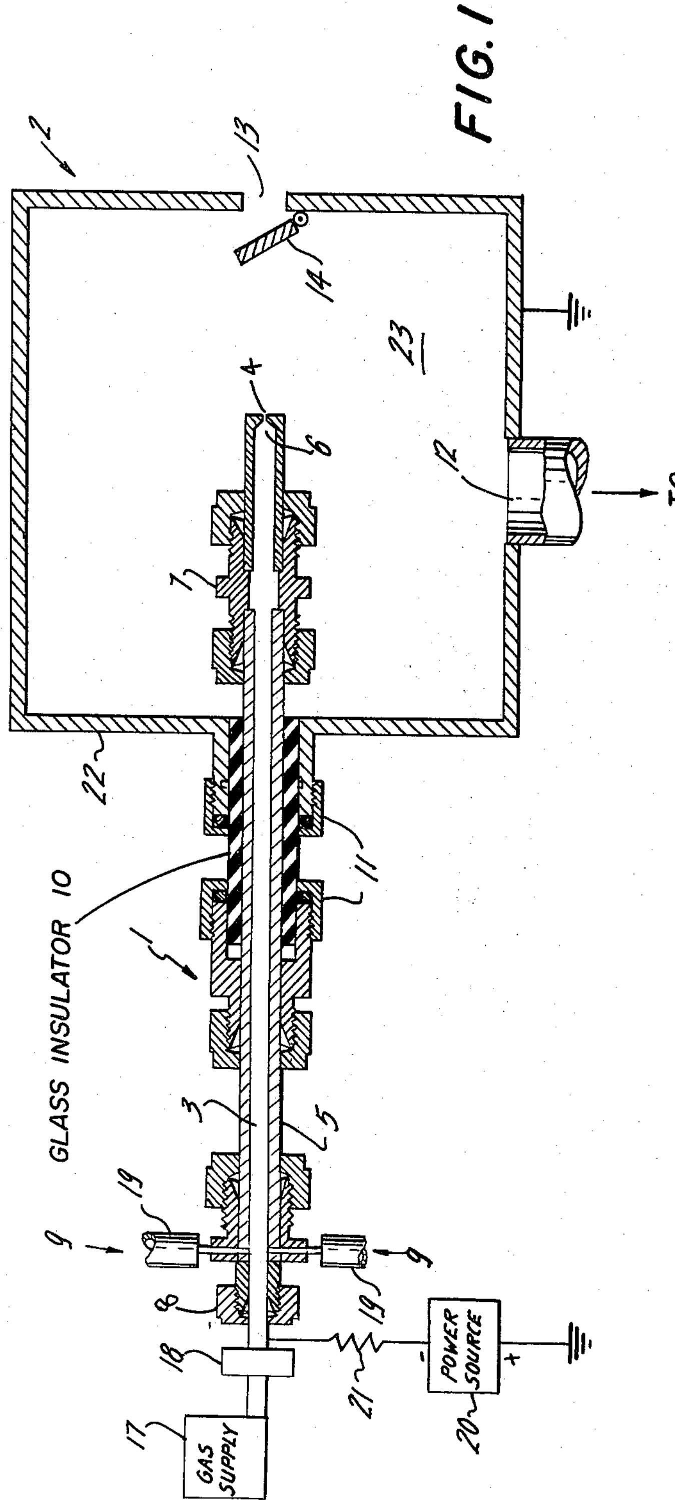
FIG. 1 is a detailed front cross-sectional view of a flowing gas discharge source of line radiation in the vacuum ultraviolet system.

A flowing gas source of vacuum ultraviolet line radiation, as shown in FIG. 1, essentially comprises of three major assemblies: (a) a source body 1; (b) a vacuum vessel 2; and (c) a gas supply 17. The source body assembly 1 has as its core a metallic tube 3 which leads at one end toward a small orifice 4 about 1 mm in diameter. The tube 3 is surrounded by a cooling jacket 5 longitudinally over its entire length. The region around the orifice is the site of the electrical discharge which produces the VUV radiation and thus is subject to elevated temperatures and some erosion. To reduce their effect the orifice 4 is cut into a stainless steel or molybdenum nozzle 6 which is attached to tube 3 by means of a stainless steel compression fitting 7. The opposite end of tube 3 is attached to a gas inlet 8 which lies adjacent to the cooling jacket inlet/outlet connections 9. Since it is necessary to bias the source body assembly 1 electrically with respect to its surroundings its external support consists of a glass insulator 10 held to tube 3 by one-half of a dual vacuum coupling 11. Further electrical isolation is obtained by connecting the source body to its gas and coolant supplies through plastic tubes 18 and 19 respectively. The insulator 10 in turn is attached to the vacuum vessel assembly 2 via the second half of the dual vacuum coupling 11. The dual coupling 11 acting with the aid of a support ring (not shown) allows longitudinal positioning and even a small lateral translation of the source body assembly 1 in the vacuum vessel assembly 2. The vacuum vessel 2 serves as the support for the source body assembly 1, an anode for the source discharge, and a means for providing an evacuated region outside the source orifice 4. The latter function is accomplished with a differential pressure means such as a mechanical vacuum pump (not shown) operating through evacuation port 12. The vacuum vessel assembly 2 contains an exit port 13 which is located directly in front of orifice 4 such that it is aligned with the source body assemblies 1 longitudinal axis. The exit port 13 is fitted with an output valve 14 which allows the source photons and gas flow to be separated at will from the devices receiving the VUV or ion output of the system.

Gas is supplied to the source via two parallel paths (not shown). One contains a variable leak valve (not shown) which maintains a slow constant flow through the source. The alternative path contains a valve (not shown) that is able to supply a short burst of gas which is measured in the feed line with a 760 mm gauge (not shown). If VUV lines of materials which are not normally gaseous are required, vapor of that substance can be injected into a pre-existing discharge from a heated boat, nozzle insert or similar structure in the nozzle region. It is important to note that regardless of whether the source is operating with a vapor or gas at the orifice it is strongly differentially pumped.

To initiate the discharge, output valve 14 is closed, the vacuum vessel is evacuated via port 12, and a negative potential is applied by power source 20 through a few hundred ohms of ballast resistance 21 to the source body assembly 1. The walls 22 of the enclosing vacuum vessel assembly 2 are grounded and a slow constant flow of gas from gas supply 17 is set through the source body assembly 1 using the leak valve. A brief burst of gas (several tens of Torr peak pressure) is admitted to the source tube 3 and emerges into the vacuum region 23 of vacuum vessel assembly 2 via the orifice 4 in nozzle 6. The resulting jet breaks down into a brightly luminous electrical discharge. As the vacuum region 23 is reevacuated by the mechanical pump via port 12 the discharge changes in character, until the pressure in region 23 reaches a steady state condition. The flow through the leak sustains the discharge under these steady state conditions. Under these conditions the pressure in region 23 of the vacuum vessel assembly 2 and the gas flow rate into it are two to three orders of magnitude smaller than their values during the initiating burst. The discharge now is a strong continuous operating source of vacuum ultraviolet line radiation. The output valve 14 may now be opened and the VUV or ion source output may be delivered to the receiving instruments without imposing a large gas load thereon. The device has operated successfully with argon at sustained pressures in the vacuum vessel region 23 of less than $5\times10^{-3}$ torr. In typical operation the prototype exhibits a steady-state current of about 300 ma. at a potential of 350 volts. The version now in use is water cooled but earlier versions have been operated for several hours with only ambient air cooling.

The system output consists of the characteristic line radiation of the discharge media. Discharges have been created with $H_2$, He, $O_2$, $N_2$, Ne, Ar, and Kr gases and, by vapor injection, with Cu and Al. Scan measurements show that the bulk of the VUV radiation comes from the immediate vicinity of the nozzle orifice 4. Parallel scintillator studies demonstrate that the total VUV brightness of the source is several times that of hollow cathode sources of similar dimensions operating at the same potential and up to 200 times higher pressure. The currents and voltages observed in the operation of the source indicate that its output comes from an abnormal glow discharge, i.e., a discharge that is in transition between a normal glow and an arc. The discharge displays current densities that are higher than expected from a normal glow and potentials that are greater than that typical of arcs. Nevertheless, the discharge is operationally stable and has been maintained for periods of several hours. An R. F. emission has been observed in the prototype anode circuit at frequencies of a few megacycles. R. F. choking has suppressed these instabilities and simultaneously reduced the minimum operating pressure of the system.

Figure 2:
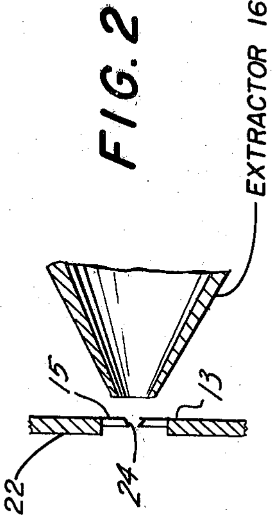
FIG. 2 is an enlarged cross-sectional view of an aperture and extractor insert in the exit port of the vacuum vessel illustrating the ion source modification.

The strong ionic lines which appear in the output indicate that the discharge is an intense source of positive ions. Useful currents of these ions have been extracted by modifying the vacuum vessel exit port 13 as shown in FIG. 2. The source orifice 4 is repositioned about 1 cm from the exit port 13. The port 13 is blocked by a tantalum disk 15 which contains a millimeter sized axial hole 24 located in approximately 1 cm in front of a hollow cone-shaped extractor electrode 16. Once the discharge has been struck by the method as described hereinbefore and has been allowed to achieve a low gas flow steady-state condition, ions may be pulled from it by electrically biasing the extractor 16 several kilovolts negative with respect to the source.

Accordingly, while there have been shown and described the preferred embodiments of the present invention, it will be understood that the invention may be embodied otherwise than as herein specifically illustrated or described and that within said embodiments certain changes in the detail and construction, and the form of arrangement of the parts may be made without departing from the underlying idea or principles of this invention within the scope of the appended claims.

What is claimed is:

1. A vacuum ultraviolet line radiation system comprising:

(a) a gas supply;

(b) a tube means having an inlet operatively connected to said gas supply, and an outlet end for carrying gas therethrough;

(c) a nozzle means fixedly mounted to the tube means at the outlet end of said tube means for sustaining an electrical discharge in an orifice positioned therein;

(d) a vacuum vessel circumambient said nozzle means having an outlet valve and outlet port axially aligned with said nozzle means and an evacuation port operatively positioned therein;

(e) a cooling jacket mounted longitudinally over said tube means;

(f) an insulator mounted upon said tube means between the inlet and outlet ends of said tube means, said insulator separating the tube means electrically from the vacuum vessel; and (g) a power source for negatively biasing said source tube means with respect to said vacuum.

2. A vacuum ultraviolet line radiation system as recited in claim 1, wherein said outlet port of the vacuum vessel is blocked by a tantalum disk having an axial hole therethrough and an extractor electrode located adjacent to said axial hole for extracting ions from said electrical discharge.

3. A VUV radiation system as recited in claim 1 wherein said extractor electrode is in the form of a hole cone.

4. A method of initiating and maintaining a stable and improved electrical discharge in a vacuum ultraviolet line radiation system, which comprises:

closing an output valve of a vacuum vessel;

evacuating said vacuum vessel to create a vacuum region in the vacuum vessel;

grounding walls of the vacuum vessel;

impressing a negative electrical potential to a tube means;

applying pressurized gas through the tube means and onto the vacuum region of the vacuum vessel resulting in a brightly luminous jet;

re-evacuating said vacuum region of the vacuum vessel until said luminous jet reaches a steady state; and opening the output valve of the vacuum vessel for applying the VUV or ion output in a steady state without imposing a gas load upon an instrument using said VUV or ion output.

* * * * *